(12) United States Patent
Volbers et al.

(10) Patent No.: US 12,110,579 B2
(45) Date of Patent: Oct. 8, 2024

(54) METHOD OF PRODUCING A CoFe ALLOY STRIP

(71) Applicant: VACUUMSCHMELZE GMBH & CO KG, Hanau (DE)

(72) Inventors: Niklas Volbers, Bruchkobel (DE); Manuel Demper, Dautphetal (DE); Joachim Gerster, Alzenau (DE)

(73) Assignee: VACUUMSCHMELZE GMBH & CO. KG, Hanau (DE)

( * ) Notice: Subject to any disclaimer, the term of this patent is extended or adjusted under 35 U.S.C. 154(b) by 0 days.

(21) Appl. No.: 17/397,295

(22) Filed: Aug. 9, 2021

(65) Prior Publication Data
US 2022/0056568 A1  Feb. 24, 2022

(30) Foreign Application Priority Data
Aug. 18, 2020  (EP) ..................... 20191604

(51) Int. Cl.
*C22F 1/16* (2006.01)
*C21D 1/04* (2006.01)
(Continued)

(52) U.S. Cl.
CPC ............... *C22F 1/16* (2013.01); *C21D 1/04* (2013.01); *C21D 8/1244* (2013.01); *C22C 30/00* (2013.01);
(Continued)

(58) Field of Classification Search
CPC .... H01F 1/147–14725; H01F 1/14766–14791; H01F 1/16–18;
(Continued)

(56) References Cited

U.S. PATENT DOCUMENTS 3,622,409 A    11/1971  McCunn et al.
5,919,319 A *   7/1999  Couderchon ........... C22C 38/10
                                                    148/309
(Continued)

FOREIGN PATENT DOCUMENTS

JP    H05279784 A  * 10/1993  ............... C21D 8/12
WO    2018091694 A1   5/2018

*Primary Examiner* — John A Hevey
(74) *Attorney, Agent, or Firm* — Dickinson Wright PLLC

(57) ABSTRACT

A method of producing a CoFe alloy strip is provided. The method comprises hot rolling a CoFe alloy to form a hot rolled strip, followed by quenching the strip from a temperature above 700° C. to a temperature of 200° C. The CoFe alloy comprises an order/disorder temperature $T_{o/d}$ and a ferritic/austenitic transformation temperature $T_{\alpha/\gamma}$, wherein $T_{\alpha/\gamma} > T_{o/d}$. The method further comprises cold rolling the hot rolled strip, after cold rolling, continuous annealing the strip at a maximum temperature $T_1$, wherein 500° C. $< T_1 < T_{o/d}$, followed by cooling at a cooling rate $R_1$ of at least 1 K/s in the temperature range of $T_1$ to 500° C., and after continuous annealing, magnetic annealing the strip, or parts manufactured from the strip, at a temperature between 730° C. and $T_{\alpha/\gamma}$.

26 Claims, 4 Drawing Sheets

(51) Int. Cl.
*C21D 6/00* (2006.01)
*C21D 8/12* (2006.01)
*C22C 30/00* (2006.01)
*H01F 1/147* (2006.01)
*H02K 15/02* (2006.01)

(52) U.S. Cl.
CPC ............ *H01F 1/147* (2013.01); *H02K 15/02* (2013.01); *C21D 6/007* (2013.01); *C21D 8/1222* (2013.01); *C21D 8/1233* (2013.01); *C21D 8/1261* (2013.01); *C21D 8/1272* (2013.01); *C21D 8/1283* (2013.01); *C22C 2202/02* (2013.01)

(58) Field of Classification Search
CPC ......... C22C 19/07; C22C 30/00; C22C 38/10; C22C 38/105; C22C 38/30; C22C 38/52; C21D 1/04; C21D 6/007; C21D 8/12; C21D 8/1216–1233; C21D 8/1244; C21D 8/1261; C21D 8/1272; C21D 8/1277–1283

See application file for complete search history.

(56) References Cited

U.S. PATENT DOCUMENTS

| | | | |
|---|---|---|---|
| 6,524,380 B1 * | 2/2003 | Briles | H01F 1/18 106/287.26 |
| 11,261,513 B2 * | 3/2022 | Volbers | H01F 1/16 |
| 2013/0000797 A1 | 1/2013 | Pieper et al. | |
| 2014/0299233 A1 * | 10/2014 | Waeckerle | A63B 23/14 148/120 |
| 2017/0346351 A1 * | 11/2017 | Volbers | H02K 1/02 |
| 2018/0112287 A1 * | 4/2018 | Fitterling | C21D 6/008 |
| 2018/0223401 A1 * | 8/2018 | Waeckerle | C22C 38/18 |
| 2019/0360065 A1 | 11/2019 | Volbers et al. | |

* cited by examiner

METHOD OF PRODUCING A CoFe ALLOY STRIP

This U.S. patent application claims priority to European patent application no. 20191604.6, filed Aug. 18, 2021, the entire contents of which is incorporated herein by reference in its entirety.

BACKGROUND

1. Technical Field

The present invention relates to a method of producing a CoFe alloy strip, in particular a strip of a CoFe alloy of a Fe—Co-2V type.

2. Related Art

Magnetically soft cobalt iron alloys (CoFe) of the Fe—Co-2V type have a high saturation polarisation which is far above conventional magnetically soft materials. The composition of commercially available Fe—Co-2V type alloys is typically 49 wt % Fe, 49 wt % Co and 2% V with some of these alloys also including additives of Ni, Nb, Zr, Ta and/or B. In a composition of this type, a saturation polarisation of about 2.3 T and a sufficiently high electrical resistance of 0.4 μΩm is attained.

These types of alloys may be used as highly saturated flux conductors or in electrical machines, for example. When used as a generator or as a motor, stators or rotors in the form of a laminated core are produced, whereby the CoFe alloy is produced as a strip having a thickness in the region of 2.0 mm to 0.050 mm, parts, also referred to as laminations, are formed from the strip which are stacked to form the laminated core.

The Fe—Co-2V type alloy, either in the form of a strip or a lamination or a laminated core, is then subjected to a heat treatment to produce the desired magnetic properties. This heat treatment is also called magnetic annealing or final annealing. The magnetic annealing takes place above the recrystallization temperature and below the phase transition $\alpha/\alpha+\gamma$ of the CoFe alloy. The annealing temperature thus commonly lies in the region of 700° C. to 900° C. During the subsequent cooling, ordering in the structure of the Fe—Co-2V type alloy takes place, i.e. a B2-superstructure is formed. The temperature at which the ordering begins during cooling depends on the composition and is typically in the region of 700° C. to 730° C. Ordering begins rapidly with a high dynamic behaviour. Therefore, after magnetic annealing the material is present in a predominantly ordered state and in this state is brittle and not suitable for die-cutting, e.g. stamping or punching, so that the laminations must be formed before magnetic annealing.

Magnetic annealing can be performed at different temperatures depending on the composition and desired combination of strength and magnetic properties. For example, commercially available alloys of the Fe—Co-2V type include VACOFLUX 50 (49% Co, 1.9% V, 0.4% Ni, the remainder being Fe) which is annealed at 820° C., VACOFLUX 48 (49% Co, 1.9% V, the remainder being Fe) which is annealed at 880° C. and VACODUR 49 (49% Co, 1.9% V, 0.1% Nb, the remainder being Fe) which is annealed at 880° C. or, depending on the particular application and demands like requirements to mechanical strength, at 750° C. The alloys are commercially available from Vacuumschmelze GmbH&Co.KG, Hanau, Germany.

Magnetic annealing and the ordering associated with it leads to a permanent change in the dimensions of the part formed from the CoFe alloy, typically a part in the form of a strip or lamination. A permanent change in length dl of the part occurs when the material of starting length $l_0$ undergoes a typical magnetic annealing. Thus, in the following, "increase in length" will always be understood as the permanent increase $dl/l_0$ relative to the starting length $l_0$. This increase in length may be in the region of 0.1% to 0.20%. A permanent change in the dimensions caused by magnetic annealing is undesirable since it directly affects the size accuracy of the lamination and therefore also of the finished laminated core. When applied as a stator or rotor, this can cause a change in the geometry of the air gap, for example, so that it causes an impairment of the magnetic circuit.

Thus, an object is to produce a punchable strip from a CoFe alloy which has a significantly reduced permanent change in length after magnetic annealing.

SUMMARY

According to the invention, a method of producing a CoFe alloy strip is provided. The method comprises hot rolling a CoFe alloy to form a hot rolled strip, followed by quenching the strip from a temperature above 700° C. to a temperature of 200° C. The CoFe alloy is of the Fe—Co-2V type and consists essentially of 35 wt %≤Co≤55 wt %, 0 wt %≤V≤3 wt %, 0 wt %≤Ni≤2 wt %, 0 wt %≤Nb≤0.50 wt %, 0 wt %≤Zr+Ta≤1.5 wt %, 0 wt %≤Cr≤3 wt %, 0 wt %≤Si≤3 wt %, 0 wt %≤Al≤1 wt %, 0 wt %≤Mn≤1 wt %, 0 wt %≤B≤0.25 wt %, 0 wt %≤C≤0.1 wt %, with the remainder being Fe as well as up to 1 wt % of impurities, wherein the impurities may comprise one or more elements from the group consisting of O, N, S, P, Ce, Ti, Mg, Be, Cu, Mo, W and up to 0.2 wt % other impurities. The CoFe alloy comprises an order/disorder temperature $T_{o/d}$ and a ferritic/austenitic transformation temperature $T_{\alpha/\gamma}$, wherein $T_{\alpha/\gamma} > T_{o/d}$. The method further comprises cold rolling the quenched hot rolled strip and after cold rolling, continuous annealing the strip at a maximum temperature $T_1$, wherein $T_1$ is less than the order/disorder temperature $T_{o/d}$ of the CoFe alloy, followed by cooling at a cooling rate $R_1$ of at least 1 K/s in the temperature range of $T_1$ to 500° C.

In some embodiments, after continuous annealing, the strip, or parts manufactured from the strip, are magnetic annealed at a temperature between 730° C. and $T_{\alpha/\gamma}$. The parts may be formed from the strip, for example stamped or cut. The parts may also be called laminations. The magnetic annealing may be carried out by the entity that continuously anneals the strip, e.g. the strip manufacturer, or by a separate entity such as a purchaser of the strip that has been continuously annealed at the temperature $T_1$ or of parts manufactured from the strip that has been continuously annealed at the temperature $T_1$.

CoFe alloys of the Fe—Co-2V type have a phase diagram that with increasing temperature has an ordered phase region $\alpha'$ (bcc, B2 type), a disordered phase region $\alpha$ (bcc, A2 type), an $\alpha+\gamma$ two-phase region in which both $\alpha$ and $\gamma$ are present, a $\gamma$ phase region (fcc, A1 type), and then a molten region. The abbreviation bcc refers to the body centred cubic crystal lattice, while fcc refers to the face centred cubic lattice. The boundary between the ordered region and disordered region $T_{o/d}$ and the boundary between the $\alpha$ and $\alpha+\gamma$ regions $T_{\alpha/\gamma}$ (also referred to as the ferritic austenitic transformation temperature) varies depending on the composition of the alloy. As the CoFe alloy is cooled down, it moves through the $T_{o/d}$ transition from a disordered to an ordered state. In the ordered state, the alloy is, however, less ductile and more difficult to work by cutting, stamping etc.

The temperature $T_{o/d}$ of the boundary between the ordered and disordered regions, also known as the order-order transition temperature, can be determined by means of Differential Scanning Calorimetry (DSC). Any phase transition will cause a difference in the heat flow between a sample and a reference undergoing the same heat treatment cycle. The DSC signal can be expressed in terms of μV/mg. A common convention is that any endothermic sample reaction will be shown as an increase in the signal, while an exothermic reaction will be displayed as a decrease in the signal.

As an example, a strip sample from a cobalt-iron alloy with a composition of 49 wt. % Co, 1.9 wt. % V, 0.1 wt. % Nb and remainder Fe is measured using DSC. The sample, which consists of a piece of strip material weighing about 20 to 60 mg, is heated in a ceramic crucible from 20° C. up to 1000° C. with a heating rate of 10 K/min. Upon heating, the transition from the ordered state to the disordered state begins at about 500° C., which causes an increase in the signal. With the given composition the signal intensity will reach a maximum ("peak") between 700° C. and 750° C. The temperature of this maximum is considered to be the temperature $T_{o/d}$ of the order-disorder transition. The determination of this peak is unambiguous, as the next phase transition, which is from the ferritic phase ($\alpha$) to the two-phase region ($\alpha/\gamma$) is well above 800° C.

To preserve the disordered state and the ductility, conventionally, CoFe alloys, such as CoFe alloys of the Fe—Co-2V type, are quenched or fast cooled from a temperature which lies above $T_{o/d}$. According to the invention, the maximum temperature $T_1$ used for the continuously annealing process is, however, less than the order/disorder temperature $T_{o/d}$ of the CoFe alloy. This is followed by cooling at a cooling rate $R_1$ of at least 1 K/s in the temperature range of $T_1$ to 500° C., whereby 500° C.<$T_1$<$T_{o/d}$. This heat treatment process produces an intermediate product which is no more disordered but has a degree of ordering, thus is partially ordered, since the maximum temperature is less than the order/disorder temperature $T_{o/d}$, but which due to the rapid cooling rate $R_1$ is not too high to prevent the strip from being formed into laminations by stamping, punching and die cutting for example.

After subsequent magnetic annealing to produce the desired magnetic properties, the permanent increase in length of the strip or parts manufactured from the strip after the continuous annealing heat treatment according to the invention is found to be significantly smaller. The dimensional change in any lateral direction after subsequent magnetic annealing is less than 0.08%, preferably less than 0.05%, if compared to the partially ordered state before the magnetic annealing. When the parts are used in a laminated core, for example, as stators or rotor, a small air gap can be set providing improved efficiency and torque for the electric machine.

This reduced permanent change in length for strips manufactured according to the invention is thought to be due to the fact that the difference in the amount of ordering between the partially ordered intermediate product formed by the continuous annealing process using the conditions described above and the typically fully ordered final product is reduced.

Reducing the permanent change in length enables reworking of the magnetically annealed strip to subsequently correct the geometry to be avoided. Such additional reworking, as e.g. grinding or honing of the stator hole or grinding of the rotor outer diameter, typically causes a worsening of the magnetic permeability at these critical places. If the laminated core is reworked by grinding, there is the risk of producing eddy currents since the grinding process can cause the smearing of the lamellae. This risk is also avoided. Also, these types of process always entail high costs and may not even be practically feasible depending on the geometry.

The permanent change in length may also differ in different directions of the strip, for example along the length of the strip, the length being the rolling direction, and along the width of the strip, the width being perpendicular to the rolling direction. This directional dependence of the permanent change in length may be referred to as anisotropic. The method of the invention results not only in a reduction in the permanent change in length, but also in the difference between the permanent change in length between the length and width, i.e. the difference is more isotropic.

A further advantage of a strip from a CoFe alloy with a marked reduction in growth is that it is possible to design a punching tool that can be used both for alloys which do not display a permanent change in length such as FeSi alloys, e.g. electrical steel with 2 to 4 wt % Si, as well as for the CoFe alloy strips. In the case of conventionally produced CoFe-strip, the use of the same tool causes problems since the stamped part geometry is changed significantly by the later growth during the annealing. By reducing this permanent growth, it is possible in principle to design a tool for both classes of material. This is an economic advantage due the very high costs of a tool of this type.

In some embodiments, after cold rolling, the strip comprises a disordered CoFe alloy phase with a bcc crystal structure and a Vickers Hardness HV 10 of at least 320, after the continuous annealing, the strip comprises a partially ordered CoFe alloy phase with a B2 superstructure, and after magnetic annealing, the strip or part manufactured from the strip comprises an ordered CoFe alloy phase with a B2 superstructure and a Vickers Hardness HV 10 of at most 300. The dimensional change in any lateral direction after this magnetic annealing is less than 0.08%, preferably less than 0.05%, if compared to the partially ordered state before the magnetic annealing.

For continuous annealing, the effects of the parameters of cooling rate, holding duration (or soaking duration or dwell time), and speed through the furnace are coupled. For cost reasons, it might seem preferable to set as fast a speed as possible for efficient production. A higher speed would lead to an increase in the cooling rate and would also shorten the dwell time of the strip in the furnace. This shortened dwell time could lead to a reduction in the degree of ordering. Furthermore, a high speed would cause a lowering of the maximum strip temperature. Consequently, in some embodiments, these parameters are adjusted to produce the desired degree of ordering and consequently ductility and punchability of the strip after the continuous annealing.

In some embodiments, 660° C.≤$T_1$<700° C., preferably 660° C.≤$T_1$<690° C. In some embodiments, the cooling rate $R_1$ lies in the range of 1 K/s to 100 K/s, preferably 10 K/s to 100 K/s. In some embodiments, the strip passes through a continuous furnace at a speed between 2 m/min to 4 m/min in order to continuously anneal the strip. In some embodiments, the dwell time of the strip in the heating zone of the continuous furnace with the temperature $T_1$ is between 30 seconds and 5 minutes. In some embodiments, the continuous annealing is carried out in an inert gas or in a dry hydrogen-containing atmosphere.

In some embodiments, the method further comprises stationary annealing the cold rolled strip and after the stationary annealing continuously annealing the strip, i.e. continuously annealing the strip at a maximum temperature $T_1$, wherein $T_1$ is less than the order/disorder temperature Told of the CoFe alloy, followed by cooling at a cooling rate $R_1$ of at least 1 K/s in the temperature range of $T_1$ to 500° C. or continuously annealing the strip according to any one of the embodiments described above. Stationary annealing may also be referred to as static annealing as the strip remains static or stationary during annealing.

In some embodiments, the additional stationary annealing is performed at a maximum temperature $T_2$ which is between the phase transition $\alpha \rightarrow \alpha+\gamma$ of the CoFe alloy and 650° C. The temperature at which the phase transition $\alpha \rightarrow \alpha+\gamma$ takes place depends on the composition of the CoFe alloy, so that the upper limit of the maximum temperature $T_2$ of the continuous annealing depends on the composition of the CoFe alloy.

In some embodiments, the stationary annealing is performed at a maximum temperature $T_2$, which lies between the order/disorder temperature and the ferritic/austenitic temperature, i.e. $T_{o/d} \leq T_2 < T_{\alpha/\gamma}$.

In some alternative embodiments, the stationary annealing is performed using a maximum temperature $T_2$ which is less that the order/disorder temperature. In some embodiments $(T_{o/d}-50K) \leq T_2 < T_{o/d}$.

In some embodiments, the temperature $T_2$ is between 650° C. and 900° C., preferably between 680° C. and 760° C.

The maximum temperature $T_2$ can be maintained for a period of 30 minutes to 10 hours.

After the stationary annealing, the strip is cooled, typically to room temperature.

After the stationary annealing, the cooling rate can be adjusted. In some embodiments, after stationary annealing the strip is cooled to less than 500° C. at a cooling rate $R_2$ of 50 K/h to 300 K/h. The cooling rate when cooling after stationary annealing can be adjusted, for example, by using a fan.

In some embodiments, the stationary annealing is carried out in an inert gas or in a dry hydrogen-containing atmosphere.

The stationary annealing according to one of these embodiments may, however, alternatively be carried out continuously so that two continuous heat treatments are used.

In some embodiments, the hot rolled strip, i.e. the strip after completion of the hot-rolling process, has a thickness $D_1$ which is between 1.5 mm and 7.0 mm, preferably between 2 mm and 4 mm, and/or the cold rolled strip, i.e. the strip after completion of the cold-rolling process, has a thickness D2 which is less than 0.50 mm, preferably between 0.04 mm and 0.35 mm.

In some embodiments, the method further comprises applying an electrically insulating layer to at least one surface of the cold rolled strip. The cold rolled strip with the electrically insulating coating is then continuously annealed according to one of the embodiments described herein.

In some embodiments, the electrically insulating layer is applied to the cold-rolled strip from a solution. The solution may be applied to the cold rolled strip by a technique such as dip-coating or spraying, for example. In some embodiments, the solution comprises a solution based on Mg-Methylate. After continuous annealing, an inorganic layer is formed from the solution for example MgO from a solution based on Mg methylate.

In some embodiments, the electrically insulating layer is an inorganic layer comprising MgO or Zirconium Oxide or Aluminium Oxide.

The magnetic annealing may be performed stationary or continuously. The cooling rate used after magnetic annealing depends on whether the magnetic annealing is performed continuously or in a stationary manner, since the cooling rates which are achievable using a continuous process are typically higher than those in a stationary annealing process.

In some embodiments, the magnetic annealing is performed at 880° C. for 6 h in a hydrogen-containing atmosphere with a dew point of less than −30° C., preferably less than −50° C.

In some embodiments, after magnetic annealing the difference between the permanent growth in a longitudinal direction and the permanent growth in a transverse direction of the strip, which has been continuous annealed at $T_1$, is less than 0.03%, preferably less than 0.015%.

In some embodiments, the method further comprises producing a melt consisting substantially of 35 wt %≤Co≤55 wt %, 0 wt %≤V≤3 wt %, 0 wt %≤Ni≤2 wt %, 0 wt %≤Nb≤0.50 wt %, 0 wt %≤Zr+Ta≤1.5 wt %, 0 wt %≤Cr≤3 wt %, 0 wt %≤Si≤3 wt %, 0 wt %≤Al≤1 wt %, 0 wt %≤Mn≤1 wt %, 0 wt %≤B≤0.25 wt %, 0 wt %≤C≤0.1 wt %, with the remainder being Fe and up to 1 wt % of impurities, wherein the impurities can have one or more of the group O, N, S, P, Ce, Ti, Mg, Be, Cu, Mo, W and up to 0.2 wt % of other impurities, casting the melt under a vacuum and, after solidifying, forming an ingot. The ingot is hot rolled to form a slab. This slab may be further hot rolled to form the hot rolled strip.

The melt may be produced using Vacuum Induction Melting (VIM), for example, which is useful for melting large quantities of starting material in one melting operation and is, therefore, suitable for an industrial scale manufacturing process. In some embodiments, a second melting process such as Electro-Slag Remelting or Vacuum Arc Melting or other Remelting procedures may be used after an initial melting process using VIM.

The magnetic annealing can be carried out on the alloy in strip form. In some embodiments, the method further comprises after the continuous annealing forming at least one part or lamination from the strip and magnetically annealing the lamination. The lamination may be magnetically annealed in a stationary annealing process or a continuous annealing process.

In some embodiments, the lamination is formed from the strip by punching or eroding or is cut by water jet or by a laser.

The invention also provides a method of fabricating a laminated core. In an embodiment, the method of fabricating a laminated core comprises performing the method of any one of the embodiments described above for fabricating the strip, forming a plurality of laminations from the strip, stacking the laminations to form a laminated core, and then magnetically annealing the laminated core.

In some embodiments, the method of fabricating a laminated core comprises performing the method of any one of the embodiments described above for fabricating the strip, forming a plurality of laminations from the strip, magnetically annealing the laminations, and stacking the magnetically annealed laminations to form a laminated core.

According to the invention, a strip of a CoFe alloy is provided that comprises a composition consisting substantially of 35 wt %≤Co≤55 wt %, 0 wt %≤V≤3 wt %, 0 wt %≤Ni≤2 wt %, 0 wt %≤Nb≤0.50 wt %, 0 wt %≤Zr+Ta≤1.5 wt %, 0 wt %≤Cr≤3 wt %, 0 wt %≤Si≤3 wt %, 0 wt %≤Al≤1 wt %, 0 wt %≤Mn≤1 wt %, 0 wt %≤B≤0.25 wt %, 0 wt %≤C≤0.1 wt %, with a remainder of Fe and up to 1 wt % of impurities, wherein the impurities may have one or more elements from the group consisting of O, N, S, P, Ce, Ti, Mg, Be, Cu, Mo, W and up to 0.2 wt % of other impurities, a strip thickness of a maximum of 0.50 mm, preferably less than 0.35 mm, an elongation to fracture A≥5%, preferably A≥10%, and a yield strength $Rp_{0.2}$≤1000 MPa, preferably $Rp_{0.2}$≤800 MPa, a tensile strength $R_m$≥800 MPa, preferably $R_m$≥1000 MPa and a permanent growth in length after magnetic annealing at a temperature between 700° C. and the phase transition α→α+γ of a maximum of 0.08%, preferably a maximum of 0.05%, In some embodiments, the strip further comprises an inorganic coating. The inorganic coating may comprise MgO. One or both of the opposing main surfaces may be covered with the inorganic coating. The inorganic coating is used to electrically insulate adjoining laminations from one another when they are stacked to from a laminated core for example.

According to the invention, a laminated core is provided that comprises a plurality of stacked sheets of a CoFe alloy, which comprises a composition consisting substantially of 35 wt %≤Co≤55 wt %, 0 wt %≤V≤3 wt %, 0 wt %≤Ni≤2 wt %, 0 wt %≤Nb≤0.50 wt %, 0 wt %≤Zr+Ta≤1.5 wt %, 0 wt %≤Cr≤3 wt %, 0 wt %≤Si≤3 wt %, 0 wt %≤Al≤1 wt %, 0 wt %≤Mn≤1 wt %, 0 wt %≤B≤0.25 wt %, 0 wt %≤C≤0.1 wt %, the remainder being Fe as well as up to 1 wt % of impurities, wherein the impurities can have one or more from the group O, N, S, P, Ce, Ti, Mg, Be, Cu, Mo, W and up to 0.2 wt % of other impurities. The sheets have a maximum thickness of 0.50 mm, preferably less than 0.35 mm, an elongation to fracture A≥5%, preferably A≥10%, a yield strength $Rp_{0.2}$≤1000 MPa, preferably $Rp_{0.2}$≤800 MPa, and a tensile strength $R_m$≥800 MPa, preferably $R_m$≥1000 MPa and a permanent length growth, after magnetic annealing at a temperature between 700° C. and the phase transition α→α+γ no more than 0.08%, preferably no more than 0.05%, In some embodiments, the sheets are separated by an inorganic coating which may be formed on one or both surfaces of adjoining laminations of the laminated core. The inorganic coating may comprise MgO.

BRIEF DESCRIPTION OF THE DRAWINGS

Embodiments and examples will now be described with reference to the drawings, examples and tables.

DETAILED DESCRIPTION OF EXAMPLE EMBODIMENTS

The length growth of CoFe alloys of the Fe—Co-2V type during final magnetic annealing can explained in terms of changes in the degree of order. According to the invention, the correlation between the degree of ordering and permanent change in length is used to reduce the permanent change in length whilst still allowing laminations to be formed by methods such as stamping from a strip which are more cost-effective for industrial manufacturing methods. A laminated core for a rotor or stator may include hundreds or thousands of laminations arranged in a stack.

In its initial cold-rolled state, the strip has a disordered, body-centred cubic (bcc) crystalline structure. In order to adjust its soft magnetic properties, the strip or a part or lamination made from the strip is subjected to final magnetic annealing in the ferritic α-region. During annealing, which typically takes place above the order-disorder transition temperature $T_{o/d}$ of the material, the ordering reoccurs upon heating up as soon as the diffusivity of atoms allows for atomic ordering and then is greatly reduced and finally suppressed entirely after surpassing $T_{o/d}$. During the relatively slow cooling process in the furnace the order then returns almost completely below temperature $T_{o/d}$ and an ordered phase (B2 superstructure) is formed.

As a result, there is a significant difference between the degree of order before and after annealing. The ordered phase has a greater lattice constant than the disordered phase and this results in a permanent change in length, i.e. the material "grows". The amount of this growth is directly dependent on the amount of change ΔS in the degree of order. The material undergoes the greatest permanent or net change in length ΔL as it transitions from the completely disordered to the completely ordered state.

Figure 1A:
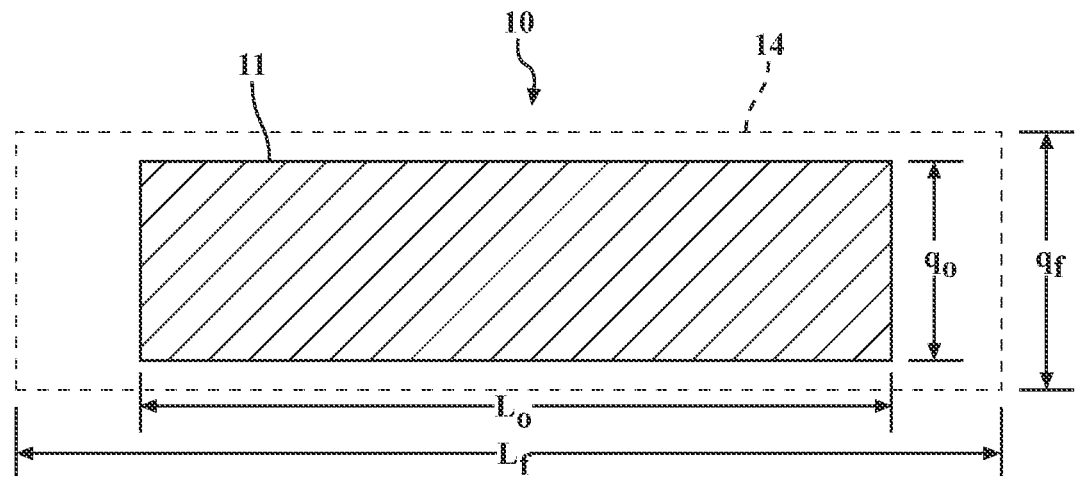
FIG. 1 shows a schematic illustration of a permanent change in length and width in laminations or parts of different shapes.
Figure 1B:
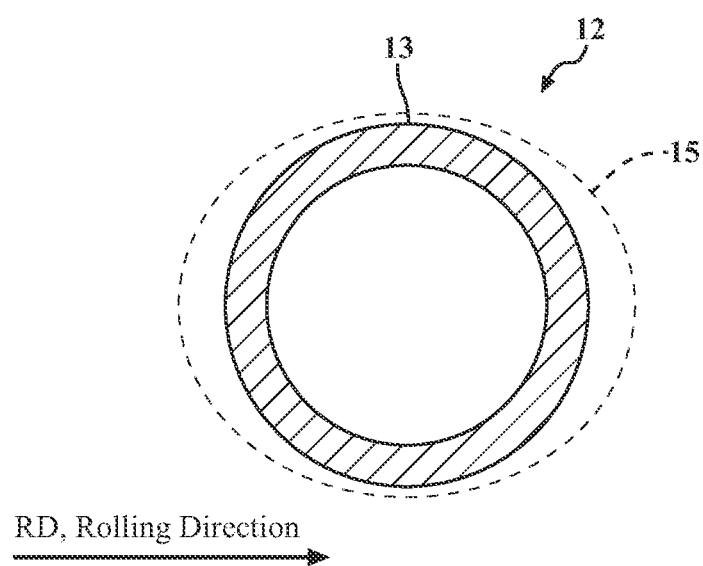

FIG. 1 shows a schematic illustration of parts or laminations of a soft magnetic CoFe alloy that illustrates the permanent growth after magnetic annealing for parts or laminations of different shapes.

FIG. 1 shows a schematic illustration of a rectangular sheet 10 having a contour before magnetic annealing that is shown with a solid line 11 and a circular ring-shaped part 12 formed from the strip having a contour before magnetic annealing that is shown with a solid line 13. The permanent growth is illustrated diagrammatically in FIG. 1 by the dotted line 14 for the rectangular sheet 10 and the dotted line 15 for the circular ring-shaped part 12. The rolling direction RD of the strip from which the lamination was formed is also indicated. FIG. 1 illustrates schematically that the permanent increase in length of the parts 10, 12 is greater in the rolling direction RD, i.e. longitudinally, than transverse to the rolling direction RD.

This change in the dimensions caused by the magnetic annealing is undesirable since it directly affects the dimensional accuracy of a single lamination or lamella, as well as the finished laminated core. When used as a stator or rotor, this can cause a change in the geometry of the air gap so that the result is impairment of the magnetic circuit.

The soft magnetic cobalt iron (CoFe) alloy can have a composition of 49 wt % Fe, 49 wt % Co and 2% V and contain additives of Ni, Nb, Zr, Ta or B. In the case of a composition of this type, a saturation polarisation of about 2.3 T is attained, while at the same time the electrical resistance remains sufficiently high at 0.4 μΩm.

The CoFe alloy undergoes heat treatment to achieve the magnetic properties, said heat treatment also being known as magnetic annealing or final annealing. This heat treatment takes place above the recrystallization temperature and below the phase transition α→α+γ, mostly in the region of 700° C. to 900° C. During the subsequent cooling, ordering takes place, i.e. a B2 superstructure is formed. Depending on the composition and the desired combination of strength and magnetic properties, the annealing takes place at different temperatures. For example, VACOFLUX 50 (49% Co, 1.9% V, 0.4% Ni, the remainder being Fe) is annealed in this manner at 820° C., VACOFLUX 48 (49% Co, 1.9% V, the remainder being Fe) at 880° C. and VACODUR 49 (49% Co, 1.9% V, 0.1% Nb, the remainder being Fe) at 880° C., or, depending on the application, at 750° C., in case a higher yield strength is required.

Due to the magnetic annealing and the ordering associated with it, the dimensions of the sheet are altered. Referring to FIG. 1, the rectangular sheet 10 has an initial length $L_0$ and a final length Lf in the rolling direction RD. Thus, the permanent variation in length dl is to be understood as the permanent "growth in length" which happens when the material of initial length $l_0$ undergoes typical annealing, i.e. $L_f$-$L_0$=dl. Below therefore, "growth in length" will always be understood as the growth $dl/l_0$ relative to the initial length. This growth in length may be in the region of 0.06% to 0.20%.

The rectangular sheet 10 has an initial width $q_0$ and a final length $q_f$ perpendicular to the rolling direction RD. Thus, the permanent variation in width dq is to be understood as the permanent "growth in length" which happens when the material of initial width $q_0$ undergoes typical annealing, i.e. $q_f$-$q_0$=dq. Below therefore, "growth in length" will always be understood as the growth $dl/q_0$ relative to the initial width. This growth in width may be in the region of 0.06% to 0.20%.

A rectangular test piece of a VACOFLUX 50 strip with a strip thickness of, for example, 0.35 mm incurs, during an annealing process of 4 hrs at 820° C., a change in length in the region of 0.1% to 0.2%. During this time, anisotropy of the growth is observed, i.e. in the longitudinal direction the strip undergoes a greater growth than in the transverse direction wherein the longitudinal direction is parallel to the rolling direction of the strip. This anisotropy of the growth is correlated with the degree of cold forming. With degrees of cold forming >60%, the growth in the longitudinal direction rises significantly, whereas the growth in the transverse direction is less. This anisotropy of the growth is undesirable, particularly in the case of circular geometries, as would be found, for example, in electrical machines, since a round shape becomes an ellipse, as illustrated in FIG. 1 with the dotted line 15.

Using the methods according to the invention, not only is the permanent change in length reduced, but also the anisotropy of the permanent change in length between the longitudinal and transverse directions is reduced. The principles used in the method according to the invention will now be explained by reference to FIG. 2 which shows a diagram illustrating an estimation of the degree of order of an Fe—Co-2V alloy as a function of temperature.

Figure 2:
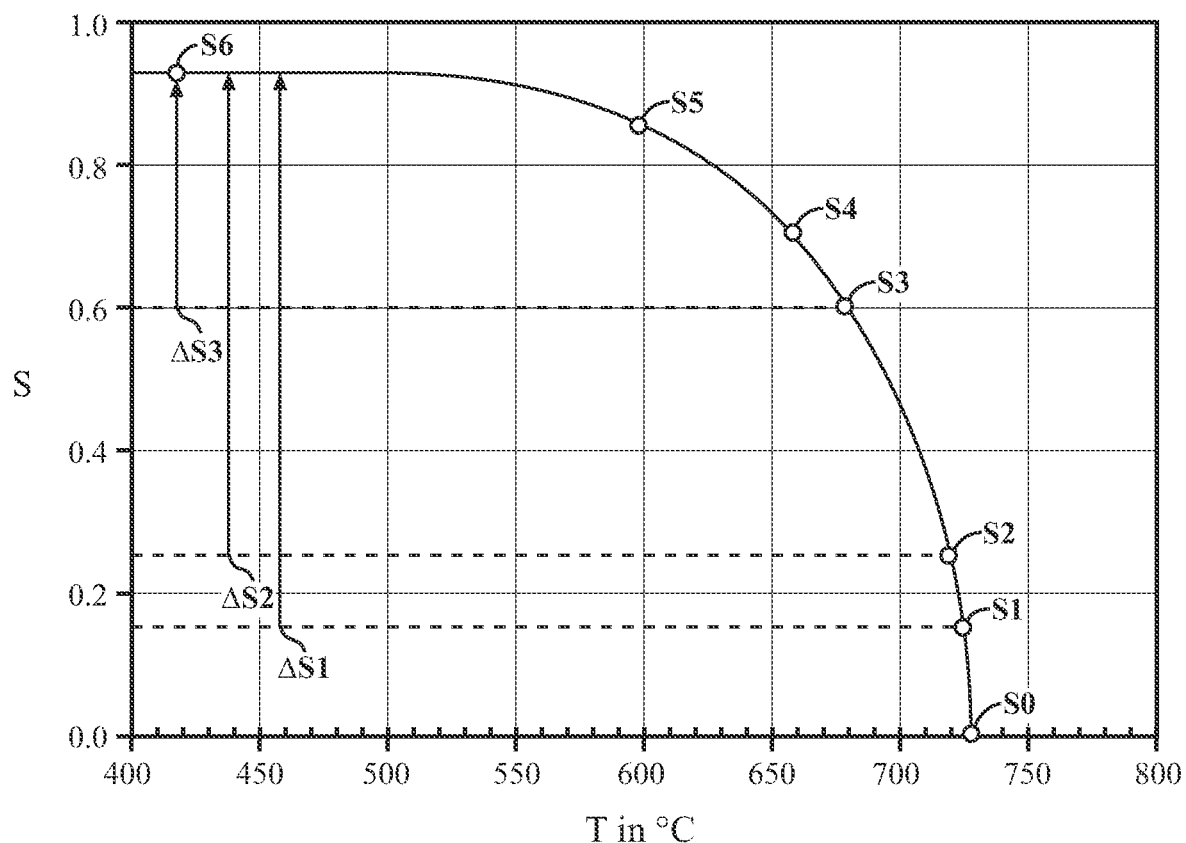
FIG. 2 shows a diagram of an estimation of the degree of order of an Fe—Co-2V alloy as a function of temperature.

The y-axis of the diagram of FIG. 2 describes the order parameter S, which in turn describes the degree of long-range order. A degree of order of S=0 corresponds to a completely disordered state; a degree of order of S=1 corresponds to a completely ordered state. The x-axis describes the temperature T at which the corresponding degree of order S(T) appears in the thermodynamic balance. Long-range order S of an Fe—Co-2V alloy is shown as a function of maximum annealing temperature T and assumes very fast cooling.

FIG. 2 is based on a publication by Stoloff, N. & Davies, R, "The plastic deformation of ordered FeCo and Fe3Al alloys" Acta Metallurgica, 1964, 12, 573-485 in which the data points were determined experimentally for binary Fe—Co. As the addition of 1.9% V increases the order-disorder transition by a few degrees, the curve has been adjusted by +9° C. to ensure that the degree of order S=0 corresponds to the order transition temperature $T_{o/d}$ determined for this composition. The data points marked S0 to S6 are not taken from the aforementioned publication but are included to illustrate the invention.

The reference point S0=0 corresponds to the smallest possible degree of order, i.e. to a disordered alloy. This state is achieved at a temperature above the order transition temperature $T_{o/d}$, which is 728° C. in this example composition. In practice, it is impossible to maintain this state right down to room temperature since for thermodynamic reasons a small degree of order occurs during cooling depending on cooling rate even for very fast quenching rates.

The reference point S1 at 725° C. is an example of a very low degree of order such as may result from quenching in a salt and ice-water bath. This is the standard treatment for hot-rolled strip, i.e. with a thickness of 2 mm to 5 mm. Quenching into a salt and ice-water bath can also, in principle, be used for thicker cold-rolled strip in the region of 0.6 mm or thicker. With this method the strip is heated to a temperature above the order temperature $T_{o/d}$ and quenched from this temperature in a salt and ice-water bath. Due to the very fast cooling with cooling rates of up to 4000 K/s, ordering is largely suppressed, i.e. this state is predominantly disordered even at room temperature.

The reference point S2 at 720° C. is an example of a very low degree of order such as may result from very fast cooling as a result of annealing in a continuous furnace, e.g. passing through a tower furnace. The strip undergoes annealing at a target temperature $T_{max}$ of more than 730° C. In an example a strip with a thickness of 0.20 mm is annealed at a temperature of 780° C. and a strip speed of 3 m/min in a tower furnace. With a 3 m-long heating zone this results in a dwell time of 1 minute. Due to the small strip thickness, the strip cools very quickly during the cooling phase at rates of between 5 K/s and 100 K/depending on furnace design (geometry, gases, strip speeds, etc.). In this particular example, the rate was between 5 K/s and 40 K/s. This type of fast cooling is only possible with thin strip, which allows heat to be dissipated sufficiently quickly. This fast cooling effectively supresses the ordering and so that the state S2, which is predominantly disordered similar to the state S1, can be achieved.

The point S3 is an example of a partially ordered state according to the invention. Like S2, this point can also be achieved by fast cooling a thin strip in a continuous furnace. In contrast to the state S2, however, a peak or maximum temperature $T_{max}$ of 680° C.—significantly below the order disorder temperature $T_{o/d}$ of the alloy—is chosen. The degree of order, which is produced during this continuous annealing heat treatment, is maintained during cooling rather than being increased further since fast cooling at cooling rates of 5 K/s to 100 K/s is used to effectively suppress any further ordering during cooling. As a result, state S3 represents a strip having a partially ordered state. However, the degree of ordering is sufficiently small to guarantee the ductility necessary for further processing. State S3 therefore represents a compromise in terms of degree of order which makes it possible both to adjust the ordering so that a permanent change in length can be largely avoided and to keep the degree of order small enough to prevent the material becoming brittle and so permit further processing, e.g. stamping of laminations from the strip.

The point S4 is a further example of a partially ordered state according to the invention. This state can be produced in a strip in the same manner as for S3, though the temperature $T_{max}$ of 660° C. used during annealing is somewhat lower. It is possible to set a partial order even at this temperature, which is lower than that used for S3 and so further below the order disorder transition $T_{o/d}$.

The reference point S5 may also set by means of continuous annealing with fast cooling. However, the lower annealing temperature $T_{max}$ of 600° C. means that the degree of order is barely reduced during annealing. The resulting degree of order is therefore already very high. This state is predominantly ordered, which means that the strip ceases to be suitable for punching, i.e. punching causes cracks in the material.

The reference point S6 is an example of a state set by means of final magnetic annealing of a lamination sheet. During this 6 h-long stationary annealing process the target temperature $T_{max}$ is set at 880° C. to achieve maximum grain growth. Since this temperature is significantly above the order-disorder transition temperature $T_{o/d}$ of the alloy, the material is completely disordered during the dwell stage of the stationary annealing process, i.e. S=0. The cooling rate of this stationary annealing is approx. 150 K/h. During cooling, the degree of order S follows the curve progression S(T) shown in the figure because the cooling rate is not sufficient to suppress ordering. The resulting degree of order in state S6 is therefore very high and the material is predominantly ordered. In this state S6 the change in length due to annealing is complete. However, this method is not suitable for a preliminary annealing prior to processing as this state is not suitable for punching.

The difference $\Delta$S1 shown in FIG. 2 corresponds to the increase in the degree of order that occurs during final magnetic annealing of a lamination if the lamination has been made from a cold-rolled strip. The strip has an initial degree of order S1, which transitions to a degree of order S6 as a result of stationary magnetic annealing with slow cooling. The difference $\Delta$S1=S1−S6 corresponds to the maximum change in degree of order observed in practice and the associated length growth $\Delta$L1 therefore also corresponds to the largest permanent change in length that is observed in practice.

The difference $\Delta$S2 shown in FIG. 2 corresponds to the difference in degree of order obtained when a cold-rolled strip is first continuously annealed at its final thickness at a temperature above the order temperature $T_{o/d}$ (state S2), laminations are then formed from the strip that subsequently undergo stationary final magnetic annealing at a dwell temperature of 880° C. (state S6). The increase in the degree of order is $\Delta$S2=S2−S6. This difference is smaller than the change from S1 to S6, i.e. $\Delta$S2<$\Delta$S1. Continuous pretreatment prior to shaping therefore also reduces length growth following final annealing, i.e. $\Delta$L2<$\Delta$L1.

The difference $\Delta$S3 shown in FIG. 2 describes the state according to the invention obtained when a cold-rolled strip is continuously annealed at final thickness but the strip temperature in the furnace remains below the order-disorder temperature Told. In the example, annealing takes place at $T_{max}$=680° C. and a strip speed of 3 m/min. This continuous annealing produces state S3, which has a degree of order that is above that of state S2. Surprisingly, it has now been established that this increased degree of order is still sufficiently low to permit further processing of the strip to form a lamination sheet, by laser cutting or punching, for example. The subsequent magnetic final annealing results in an increase in the degree of order of $\Delta$S3=S3−S6 with the associated length growth $\Delta$L3.

Use of the state S3 for the strip before fabrication of the lamination from the strip according to the invention, results in the smallest length growth $\Delta$L3 after final magnetic annealing of that lamination, i.e.

$$\Delta S3 < \Delta S2 < \Delta S1 \Leftrightarrow \Delta L3 < \Delta L2 < \Delta L1.$$

A further reduction in length growth by means of a further increase in the degree of order, as in example S5, may not be practicable. Firstly, at S5 the strip is no longer suitable for punching and, secondly, in some cases it is also unsuitable for cutting. This prevents a strip with the state S5 from being further processed into lamination. Thus, there is an upper limit to the degree of ordering that can be allowed to be present in the strip after continuous annealing.

According to the invention, the desired degree of ordering in the strip is achieved by selecting a maximum temperature for continuously annealing that is less than the order-disorder temperature Told and by selecting appropriate cooling rates so that the degree of ordering does not increase to a level that is too high during the subsequent cooling after continuous annealing. Thus, the continuously annealed strip can be formed into a lamination and the final lamination after magnetic annealing displays a reduced permanent increase in length and a reduced anisotropy of the permanent increase in the length between the longitudinal and transverse directions.

In the method according to the invention in which annealing is carried out below the temperature of the order-disorder transition $T_{o/d}$ to set a partial ordering, recrystallization is only partial because the recrystallization temperature coincides with the temperature of the ordering. This is due to strongly reduced diffusion in the ordered state, which prevents recovery and recrystallization until the order has been almost completely suppressed.

As a result of this partial recrystallization, the hardness of the strip after continuous annealing is still clearly higher observed for with stationary annealing above the order transition temperature $T_{o/d}$. For example, a cold-rolled VACODUR 49 strip with a thickness of 0.35 mm or less exhibits an HV10 Vickers hardness of at least 350. While the hardness falls to values of HV10 250 or lower after stationary annealing at a temperature above $T_{o/d}$, the continuous annealing method according to the invention with a maximum temperature below $T_{o/d}$ results in an HV10 hardness of 300 or more.

Depending on the degree of order, the hardness may even increase in relation to the reference state, i.e. to HV10 values of 400 or above, due to the interaction of partial order and vanadium precipitations in the classic composition 49Co49Fe2V. The number of these precipitations is strongly dependent on the dislocation density in the material because the dislocations serve as crystallisation nuclei. A high dislocation density results in many fine, sub-microscopically small precipitations and thus in a greater increase in hardness. However, excessively high hardness is disadvantageous for further processing since it results in high levels of wear on the punching tool. If possible, therefore, the extent of recrystallization should already be as high as possible in the cooling phase of the heat treatment, in particular when passing through the temperature range of 650° C. to 500° C., in order to keep dislocation density to a minimum and prevent precipitations.

In some embodiments, an additional stationary annealing is carried out before the strip is continuously annealed at the temperature Ti. This additional stationary annealing can be called a preceding stationary annealing. In order to reduce dislocations, it is therefore possible as an optional step, to add a stationary recovery annealing process before continuous annealing. The annealing temperature should ideally be above the temperature of the ordering since in this case both recovery and recrystallization will occur.

In principle, however, a long annealing time at lower temperatures can result in a significant reduction in dislocations. Therefore, in some alternative embodiments, this recovery additional annealing can take place at up to 50° C. below the order disorder temperature $T_{o/d}$.

After the stationary recovery annealing, in the subsequent continuous annealing process according to the invention, this reduction in dislocation density results in markedly lower precipitations containing vanadium. This significantly reduces the hardness of the material, reaching levels of below HV10 250.

Surprisingly, it has also been observed that another result of this pre-treatment, i.e. continuously annealing at a maximum temperature $T_1$ and optional prior stationary annealing, is that isotropic length growth occurs during final magnetic annealing of a formed part. This pre-treatment significantly reduces the anisotropy between longitudinal and transverse growth that can be observed in cold-rolled or partially crystallised material.

One explanation for the decrease in anisotropy is thought to be that due to the recrystallization of the material and the decrease in dislocation density, the remaining length growth in this state is due exclusively to the transition from the partially ordered to the ordered state.

In consequence the surplus in growth in the longitudinal direction exceeding the growth in the transverse direction is deemed to be linked to the formation of the a.m. V-rich precipitates in conjunction with a higher dislocation density.

To summarise, according to the invention the process steps involved in producing a strip from a CoFe alloy having a 49 wt % Fe, 49 wt % Co and 2% V type composition with a reduced permanent change in length and reduced anisotropy of the permanent change in length are as follows:

Coating the Cold-Rolled Strip (Optional)

The application of an inorganic magnesium methylate-based coating prior to stationary annealing prevents the strip layers from fusing together during heat treatment. Some of the coating used transforms into solid magnesium oxide during heat treatment. Other coatings based on zirconium and aluminium oxide may also be used.

Stationary Annealing (Optional)

This heat treatment is intended to remove any cold deformation of the strip and eliminate dislocations and to recrystallize the material (initial primary recrystallization). The maximum temperature during the heat treatment process on the strip is selected such that the order is at least partially suppressed and the phase transition $\alpha \rightarrow \alpha+\gamma$ is not exceeded. The dwell temperature of the stationary annealing is therefore typically within a range of 650° C. to 900° C. and preferably between 680° C. and 800° C. After stationary annealing, the strip is cooled within a range of 700° C. to 500° C. typically at a cooling rate of 50° K/h to 200° K/h. This may vary depending on the furnace used and its loading.

Continuous Annealing

This annealing procedure serves both to produce a partial degree of order with the aim of reducing permanent length growth and to ductilise the strip due to the fast cooling rates associated with continuously annealing The peak temperature $T_1$ during the heat treatment process on the strip must be selected such that the order is partially suppressed and the order-disorder transition of the material is not exceeded. The temperature which may be used for Ti lies within a range of 600° C. to 700° C. and may vary depending on composition. For VACODUR 49, for example, a target annealing temperature of 680° C. and a throughput speed of 2 m/min to 4 m/min have been found to produce good results. Here the cooling rate should reach at least 1 K/s, and preferably at least 10 K/s, between 680° C. and 500° C.

Alternatively, the strip may undergo pre-annealing, i.e. recovery annealing, in a continuous furnace rather than stationary annealing. In this case it is necessary, where appropriate, to adjust the dwell time of the strip at the recrystallization temperature in the continuous furnace so as to achieve sufficient recrystallization.

The two annealing processes can also be carried out in one continuous furnace with a plurality of temperature zones. Here the last temperature zone prior to fast cooling is selected such that the temperature lies within the order transition. This represents a combination of the two annealing procedures in one process step.

In some embodiments, the strip produced according to the invention comprises the following properties:

Maximum strip thickness 0.50 mm, preferably less than 0.35 mm

Length growth after final magnetic annealing in the temperature range from 730° C. to the $\alpha \rightarrow \alpha+\gamma$ phase transition max. 0.08%, preferably max. 0.05%

Anisotropy between longitudinal and transverse growth after final magnetic annealing in the temperature range from 730° C. to the $\alpha \rightarrow \alpha+\gamma$ phase transition max. 0.03%, preferably max. 0.015%

Based on a series of tests carried out on five samples, the results below show the extent to which the strip fabricated according to the invention differs from materials produced according to the comparison methods.

TABLE 1

| Example | Type | Stationary annealing | Continuous annealing | Magnetic annealing |
| --- | --- | --- | --- | --- |
| a | Reference (R) | — | — | 6 h 880° C., $H_2$ |
| b | Reference (R) | — | 780° C. 3 m/min, $H_2$ | 6 h 880° C., $H_2$ |
| c | Invention (I) | — | 680° C. 3 m/min, $H_2$ | 6 h 880° C., $H_2$ |
| d | Invention (I) | 2 h 750° C., $H_2$ | 680° C. 3 m/min, $H_2$ | 6 h 880° C., $H_2$ |
| e | Invention (I) | 2 h 750° C., $H_2$ | 650° C. 3 m/min, $H_2$ | 6 h 880° C., $H_2$ |

Table 1 shows an overview of test samples. The samples were produced using 0.2 mm thick VACODUR 49 strip with a composition of 48.75% wt % Co, 1.88% wt % V, 0.10% wt % Nb, 0.19% Ni, 0.03% Mn, 0.02% Si, less than 0.0050% C and the rest Fe and unavoidable impurities with approx. 90% cold deformation. Other elements may also occur with contents of no more than 0.02% wt % depending on the melting techniques used. The class of materials referred to as V Permendur with a rough composition of 49% wt % Fe, 49% wt % Co and 2% wt % V represent one such exemplary composition.

For this composition the temperature $T_{o/d}$ of the order disorder transition is approx. 728° C.

Example "a" underwent neither stationary nor continuous annealing and is therefore a reference or comparison example having the cold-rolled, fully-hard state. After shaping by means of punching, parts produced from the material underwent final magnetic annealing for 6 h at 880° C. This was done in a dry hydrogen atmosphere with a dew point of −50° C. and was identical for the other examples "b" to "e".

Example "b" underwent continuous annealing prior to continuous final magnetic annealing for 6 h at 880° C. The strip was passed through a vertical tower furnace with a 3 m-long heating zone at 780° C. above the order transition of the alloy. The strip speed was 3 m/min. This results in a dwell time in the heating zone of 1 minute. The atmosphere used was dry hydrogen. The dew point was typically in the region of −30° C. In this production method the material was cooled by being passed through a water-cooled muffle, achieving cooling rates in the strip of approx. 5 to 40 K/s.

Examples "c", "d" and "e" describe examples according to the invention in which length growth is reduced by a partial ordering achieved by means of continuous annealing below the order-disorder transition temperature $T_{o/d}$ of the alloy.

The material from example "c" was passed through a vertical tower furnace with a 3 m-long heating zone without use of a prior stationary annealing as for example "b" but at a temperature of 680° C., which his less than $T_{o/d}$, and at a strip speed of 3 m/min.

The strips in examples "d" and "e" underwent stationary annealing before continuous annealing at 680° C., which is less than $T_{o/d}$, at 3 m/min (example "d") and 650° C. at 3 m/min (example "e") respectively, both temperatures being lower than $T_{o/d}$.

For stationary annealing, coiled strip with typical weights between 50 kg and 500 kg was annealed in a bell-type furnace in dry hydrogen at 750° C. for 2 h to remove dislocations and produce recrystallization. To prevent the strip layers of the coil from fusing together during stationary annealing the strip was first coated with a magnesium methylate solution.

Figure 3A:
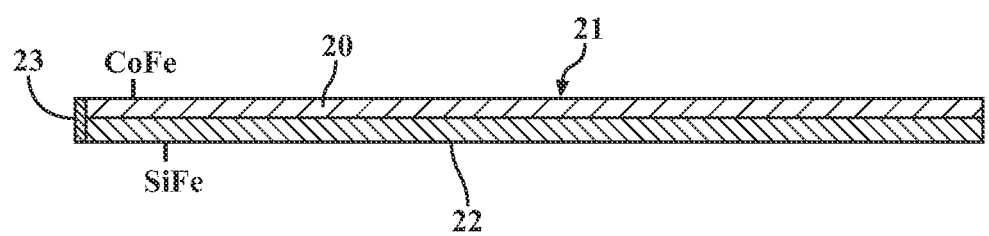
FIG. 3 illustrates samples for determining length growth in a CoFe+SiFe composite strip system a) before and b) after final magnetic annealing.
Figure 3B:
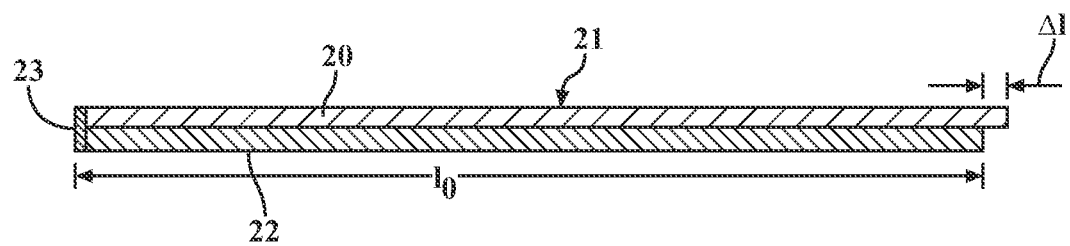

FIG. 3 illustrates samples for determining length growth in a CoFe+SiFe composite strip system. FIG. 3a illustrates the samples before and FIG. 3b after final magnetic annealing. $\Delta l/l_0$ gives the change in length of the CoFe strip.

To determine permanent change or increase in length, five strips 20 of the CoFe alloy measuring 165×20 mm were cut longitudinally (l) and transversely (q) from the 0.2 mm-thick strip for the examples "a" to "e" which represent different annealing states. The permanent length growth was then determined precisely using composite strips 21. To do this, the CoFe strips 20 were placed on a reference material 22 that showed no change in length after final annealing (in this case a pre-annealed TRAFOPERM N4 (SiFe) with a thickness of 0.35 mm) and welded flush to one side 23 (spot welded). These composite strips were then "calibrated" on the non-joined side 24 to a uniform length $l_0$ by means of a cutting disc (see FIG. 3a).

Following heat treatment, length growth $dl/l_0$ was calculated from the increase in length $\Delta l$ of the CoFe strip 20 compared to the reference material 22 (see FIG. 3b), determined using an optical microscope, and the initial length $l_0$ of the composite strip.

Alternatively, length growth can be determined on parts or reference samples by comparative length measurements of a previously defined length $l_0$ of the strip in the rolling direction before and after final magnetic annealing. Length growth $dl/l_0$ is calculated from length $l_0$ determined before annealing using standard measurement methods and length $l_1=l_0+\Delta l$ after final magnetic annealing. $dl/l_0=(l_1-l_0)/l_0=\Delta l/l_0$.

Comparative length measurements of a previously defined width $q_0$ of the strip perpendicular to the rolling direction before and after final magnetic annealing. Length growth $dq/q_0$ is calculated from length $q_0$ determined before annealing using standard measurement methods and width $q1=q_0+\Delta q$ after final magnetic annealing. $dl/q_0=(q_1-q_0)/q_0=\Delta q/q_0$.

Table 2 illustrates permanent length growth $dl/l_0$ after final magnetic annealing of examples "a" to "e" at 880° C. for 6 h ("R"=Reference; "I"=State according to the invention)

Table 2 shows the average value of the $dl/l_0$ results of the length measurement on composite samples of the various embodiments described above after final magnetic annealing at 880° C. for 6 h, and the dimension $|dl/l_0−dq/q_0|$ for the growth anisotropy. The latter is the absolute value determined from the difference between $dl/l_0$ (relative longitudinal growth) and $dq/q_0$ (relative transverse growth).

TABLE 2

| Example | Type | Strip Annealing | $dl/l_0$ in % longitudinal (l) | $dq/q_0$ in % transverse (q) | $\|dl/l_0-dq/q_0\|$ in % |
|---|---|---|---|---|---|
| a | R | — | 0.1337 | 0.1054 | 0.0283 |
| b | R | — <br> 3 m/min @ 780° C. | 0.0737 | 0.0559 | 0.0178 |
| c | I | — <br> 3 m/min @ 680° C. | 0.0489 | 0.0457 | 0.0032 |
| d | I | 2 h 750° C. <br> 3 m/min @ 680° C. | 0.0219 | 0.0240 | 0.0021 |
| e | I | 2 h 750° C. <br> 3 m/min @ 650° C. | 0.0344 | 0.0396 | 0.0052 |

Starting with the cold-rolled reference example "a", example "a" clearly exhibits a length growth of 0.1337% longitudinally and 0.1054% transversely in relation to the direction of rolling. This order of magnitude is typical of strips in the 50% CoFe alloy group that have a high cold deformation of over 80%. A high anisotropy $|dl/l_0−dq/q0|$ of approx. 0.0283% between longitudinal and transverse growth is also observed. For strip with a high degree of cold deformation (e.g. 0.1 mm thick) the anisotropy can even significantly exceed values of 0.1%.

The characteristics of the cold-rolled reference example and their magnitude make it difficult if not practicably impossible to compensate for the prevailing anisotropic growth by adapting a punching tool.

The samples examined from example "b", for which continuous annealing at 3 m/min and 780° C. above the order transition of 50% CoFe alloy was selected, exhibit reduced length growth compared to samples from example "a".

Figure 4:
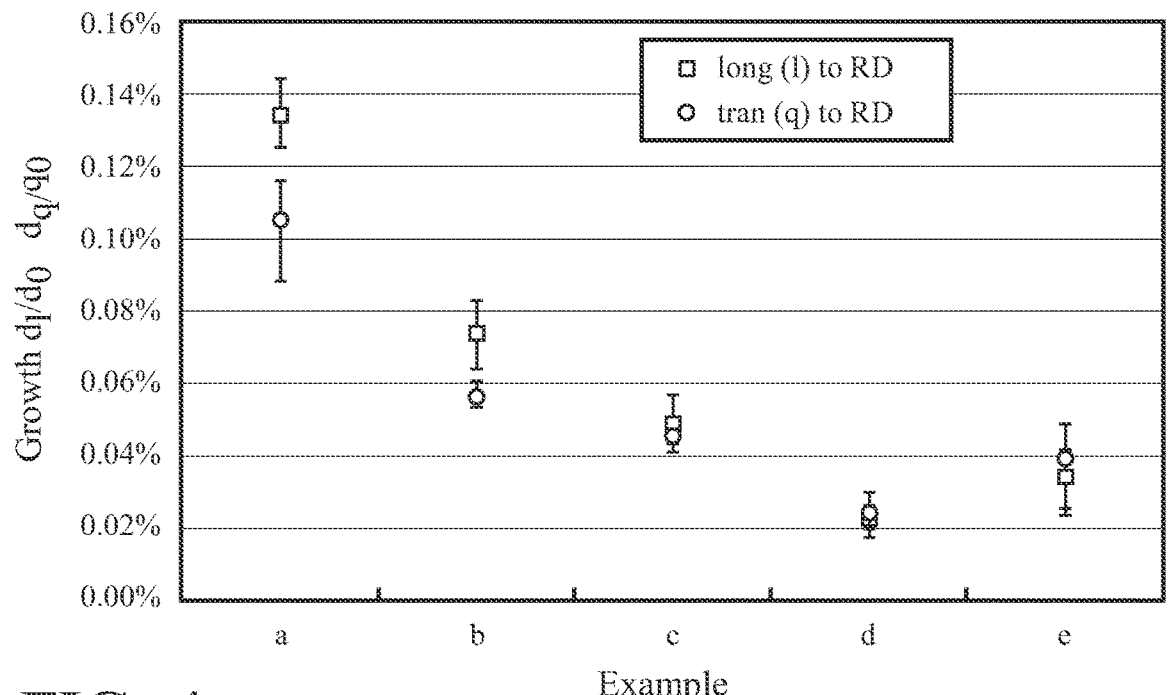
FIG. 4 illustrates a diagram of average length growth $dl/l_0$ and width growth $dq/q0$ for examples "a" to "e" longitudinally and transversely to the direction of rolling.

FIG. 4 illustrates average length growth dl/l0 longitudinally (long) and dq/q0 transversely (tran) in relation to the direction of rolling RD for the various embodiments. FIG. 4 shows that at 0.0737% longitudinally and 0.0559% transversely in relation to the direction of rolling the characteristics of the samples in example "b" are lower than those in example "a" (0.1337% longitudinally and 0.1045% transversely).

Figure 5:
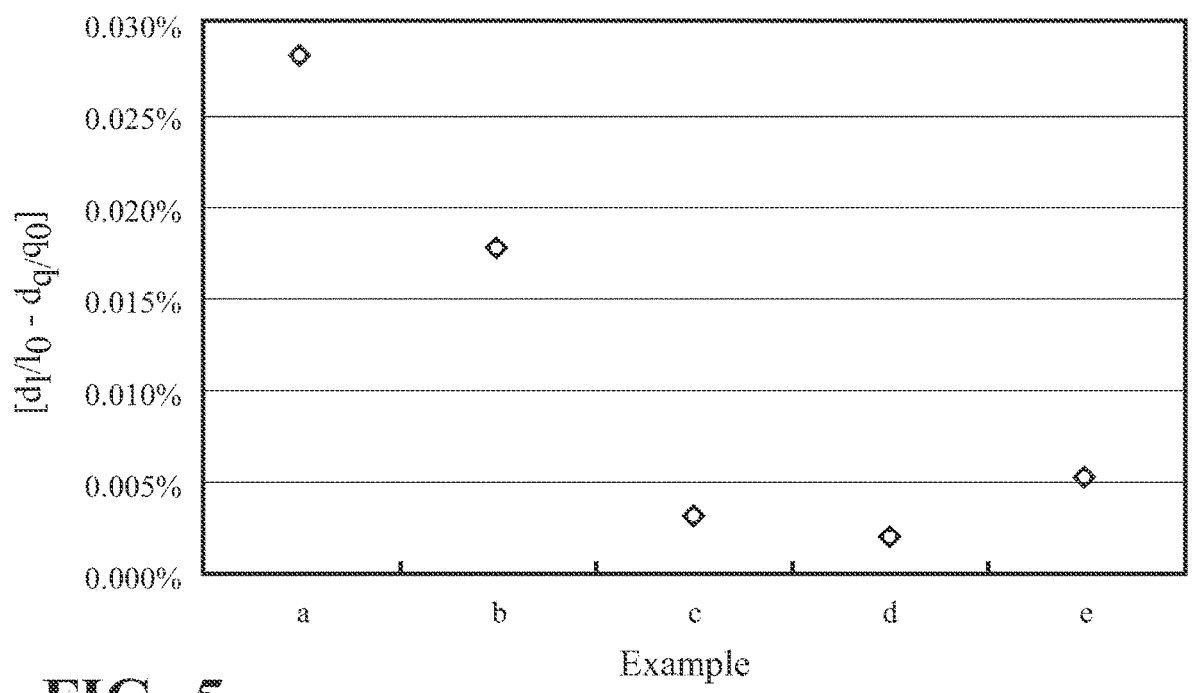
FIG. 5 illustrates a diagram of average anisotropy $|dl/l_0 - dq/q_0|$ by embodiment.

This is also reflected in the anisotropy |dl/lo−dq/q0| as shown for the various examples in Table 2 and the diagram of FIG. 5

Compared with reference example "a", the length growth of the samples made of "b" is clearly more isotropic. With values, in particular relating to anisotropy, this clearly makes it significantly easier to design a punching tool for producing dimensionally stable finally annealed parts.

FIG. 4 illustrates a diagram of average length growth dl/l0 for examples "a" to "e" longitudinally (open squares) and transversely (open circles) in relation to the direction of rolling. FIG. 4 also illustrates the growth in length of the samples made from examples "c" to "e" according to the invention is once again lower than in the samples from examples "a" and "b". In particular, the samples from example "d", with an average growth of 0.0219% longitudinally and 0.0240% transversely in relation to the direction of rolling, show the lowest comparative change in length.

This indicates the hindrance of growth by a partially set order caused by the continuous annealing below the order transition temperature of the alloy in conjunction with the corresponding cooling rates of 5 K/s to 40 K/s.

FIG. 5 illustrates that the anisotropy |dl/lo−dq/q0| of the samples of examples "d" and "e" according to the invention, which have undergone stationary annealing at 750° C. for 2 h as well as continuous annealing at 3 m/min and 680° C. (or 650° C.), have a reduced anisotropy of 0.0021% (or 0.0052%). A similar trend can be observed for example "c". As a result, it is possible to design a punching tool for producing dimensionally stable, finally annealed parts from 50% CoFe, in particular for states "c" to "e" due to the low growth and, above all, the high isotropy between longitudinal and transverse changes in length.

The bending and cutting properties of the strips were also investigated. In addition to low growth and high isotropy between linear expansion longitudinally and transversely in relation to the direction of rolling of 50% CoFe alloys, which makes it easier to design a punching tool, the machining properties (punching, cutting properties, etc.) of such a material are also significant.

The following tests were carried out to evaluate these properties:

Back-and-forth bending test according to DIN EN ISO 7799 to determine flexural strength Visual analysis of the resulting breaking edges Cutting test using metal shears evaluate cutting properties To this end, five samples measuring 165×20 mm were cut from the material of examples "a" to "e" both longitudinally and transversely in relation to the direction of rolling.

The back-and-forth bending test, which counts bending cycles N to the first crack, is carried out transversely to the direction of sampling. Bending in samples taken longitudinally therefore corresponds to deformation transverse to the direction of rolling. By the same token, in samples taken transversely to the direction of rolling, bending test deformation is longitudinal in relation to the direction of rolling. In what follows, the terms "longitudinal/ly" and "transverse/ly" are used to designate the direction of sampling.

TABLE 3

| | | | | Back-and-forth bending test | | | |
|---|---|---|---|---|---|---|---|
| | | | | Longitudinal sample Bending transverse to direction of rolling | | Transverse sample Bending longitudinal to direction of rolling | |
| State | Type | Strip Annealing | Cutting test | N | Quality of fracture edge | N | Quality of fracture edge |
| a | R | — | Very good | 13 | ++ | 3 | ++ |
| b | R | — 3 m/min @ 780° C. | Good | 18 | ++ | 8 | ++ |
| c | I | — 3 m/min @ 680° C. | Good | 11 | ++ | 3 | + |
| d | I | 2 h 750° C. 3 m/min @ 680° C. | Good-very good | 17 | ++ | 16 | + |
| e | I | 2 h 750° C. 3 m/min @ 650° C. | Good | 23 | ++ | 4 | − |

Table 3 illustrates the cutting and bending properties of the examples examined, where "R"=Reference, "I"=State according to the invention.

In order to obtain a fracture edge suitable for evaluation from the bending test, samples continued to be bent after the first cracks appeared until they fractured completely. In addition, the cutting test using metal shears was carried out on one of the resulting fragments. The results of the bending test (average bending cycle from the five samples) and the qualitative evaluation of the cutting test and the fracture edge are given in Table 3.

The cutting quality and the appearance of the fracture edge from the bending test on the samples of example "a" (cold-rolled strip) were used as the benchmark for the cutting properties and quality of the fracture.

When evaluating the cutting properties, the following qualitative grades were used: "very good" for a smooth cut; "good" for a slightly "ragged" to smooth cut; "poor" in case of transverse cracks or similar defects in the cross section. When describing the appearance of the fracture edge, the evaluation "++" denotes a smoothly broken strip, "+" a slightly jagged strip and "−" a severely jagged strip (with additional transverse cracks).

Visual evaluation of the cutting properties and fracture edges reveals comparable levels of cutting and fracture quality in the strips from examples "c" to "e" according to the invention and the samples of comparison examples "a" and "b". Once again, the fracture quality appears to decrease for example "e" samples taken transversely in relation to the direction of rolling.

For the samples of examples "c" to "e" taken longitudinally and transversely, however, the number N of bending cycles from the back-and-forth bending test (see Table 3), which is strongly dependent on the strip thickness and bending radius used and can therefore only be used comparatively, is at the same level as the reference samples. Indeed, the samples of example "d" that underwent preliminary stationary annealing actually reveal a higher number of bending cycles.

The examination of bending and cutting properties shows that, in addition to low growth and high isotropy in the length change, the samples of examples "c" to "e" according to the invention can also be adequately processed to form sheets (cutting properties) or parts (punching and bending).

The highest level of processability can be expected from material of example "d", which underwent the optional preliminary stationary annealing at 750° C. before the continuous annealing.

The mechanical characteristics of the strips were also investigated. Another method of examining processability is the determination of mechanical characteristics using hardness and tensile testing.

To determine hardness, yield strength (Rp0.2), tensile strength (Rm) and elongation at fracture (A) five tensile samples were taken longitudinally and transversely in relation to the direction of rolling from the material of each of examples "a" to "e". Before the samples were subjected to tensile testing, Vickers hardness testing (HV) was carried out in the region of clamping.

Table 4 shows the average hardness from the tests on the samples of examples "a" to "e". The average hardness of the samples of example "b" is clearly slightly lower than that of the reference in the cold-rolled example "a" and a partial crystallisation of the material can therefore be assumed. The average result of the test carried out on the sample of example "c", however, reveals an increase in hardness above a value of 400. This material is therefore still in the non-re-crystallised range.

By contrast, the samples of pre-annealed states "d" and "e" with a hardness of approx. HV=230 are clearly softer than those of the cold-rolled state. A re-crystallised structure can therefore be assumed.

TABLE 4

| State | Type | Strip Annealing | HV hardness |
|---|---|---|---|
| a | R | — | 362 |
| b | R | — 3 m/min @ 780° C. | 310 |
| c | I | — 3 m/min @ 680° C. | 444 |
| d | I | 2 h 750° C. 3 m/min @ 680° C. | 229 |
| e | I | 2 h 750° C. 3 m/min @ 650° C. | 228 |

Table 4 illustrates mechanical characteristics from hardness testing on examples "a" to "e", ("R"=Reference, "I"=State according to the invention)

Table 5 and table 6 give the average results of the tensile test carried out on the samples. In addition to the values observed for 0.2% yield strength (Rp0.2), tensile strength (Rm) and elongation at fracture (A), it also gives the difference between tensile strength and yield strength (Rm–Rp0.2). This is a measure of the plastic deformability of the material.

TABLE 5

| | | | Tensile test (longitudinal) | | | |
|---|---|---|---|---|---|---|
| State | Type | Strip Annealing | Rp0.2 (MPa) | Rm (MPa) | Rm-Rp0.2 (MPa) | A (%) |
| a | R | — | 1191 | 1224 | 33 | 0.3 |
| b | R | — 3 m/min @ 780° C. | 805 | 1297 | 492 | 14.6 |
| c | I | — 3 m/min @ 680° C. | 1240 | 1518 | 278 | 6.9 |
| d | I | 2 h 750° C. 3 m/min @ 680° C. | 427 | 1033 | 606 | 14.9 |
| e | I | 2 h 750° C. 3 m/min @ 650° C. | 446 | 664 | 218 | 5.4 |

Table 5 illustrates the mechanical characteristics from tensile tests carried out longitudinally in relation to the direction of rolling of states "a" to "e" ("R"=Reference; "I"=State according to the invention).

Starting with the results of the tensile test carried out on the samples taken longitudinally to the direction of rolling (see Table 5), it is clear that, when compared with the cold-rolled reference example "a", the samples from example "b" have on average both a lower $Rp_{0.2}$ and a high $R_m$. This results in a high plastically deformable region for the material from example "b". Here the elongation at fracture of the samples is above 14%.

Similar behaviour can be observed in the samples of example "d" according to the invention. Here the tensile strength at 1033 MPa rises on average only just above 1000 MPa, though a large plastic region of over 606 MPa is achieved in conjunction with the low Rp0.2 (on average approx. 427 MPa). At approx. 15%, the elongation at fracture is much higher than that of the cold-rolled example ("a").

With an average plastic region (Rm–Rp0.2) of 278 MPa or 218, the samples of states "c" and "e" according to the invention exhibit the lowest values of the tensile samples of the other annealed variants. Indeed, in the samples of example "c", Rp0.2 is higher than the value of the tensile samples from example "a". However, with an average elongation on fracture A of 6.9% and 5.4% longitudinally in relation to the direction of rolling, the material of examples "c" and "e" is above that of the reference strip of "a".

TABLE 6

| | | | Tensile test (transverse) | | | |
|---|---|---|---|---|---|---|
| State | Type | Strip Annealing | Rp0.2 (MPa) | Rm (MPa) | Rm-Rp0.2 (MPa) | A (%) |
| a | R | — | 1286 | 1353 | 67 | 0.3 |
| b | R | — 3 m/min @ 780° C. | 893 | 1302 | 307 | 9.3 |
| c | I | — 3 m/min @ 680° C. | 1318 | 1403 | 85 | 2.0 |
| d | I | 2 h 750° C. 3 m/min @ 680° C. | 475 | 697 | 222 | 5.7 |
| e | I | 2 h 750° C. 3 m/min @ 650° C. | 469 | 733 | 264 | 6.4 |

Table 6 illustrates mechanical characteristics from tensile tests carried out transversely in relation to the direction of rolling of states "a" to "e" ("R"=Reference; "I"=State according to the invention).

The testing of mechanical characteristics on samples taken transversely in relation to the direction of rolling (see Table 6) show a trend similar to the results of the tensile tests on the samples taken longitudinally in relation to the direction of rolling. The relevant samples of all examples tend to have a higher Rp0.2. In conjunction with the tensile strengths Rm determined this leads, in the samples of states "a" to "e", on average to a reduction in the plastic region (Rm-Rp0.2) in the transverse direction. However, in the material of example "b" (Rm-Rp0.2=307 MPa) and states "d" and "e" according to the invention (Rm-Rp0.2=222 MPa and Rm-Rp0.2=264 MPa), which underwent preliminary stationary annealing, average elongations at fracture of over 9% to over 5 to 6% are observed.

The tensile test on the samples of example "c" according to the invention (no preliminary stationary annealing), on the other hand, once again reveals on average a very high Rp0.2, a narrow plastic deformability range of 85 MPa resulting from Rm and Rp0.2 and a low elongation at fracture A of 2%.

In conjunction with the high hardness and the low number of bending cycles in samples taken transversely in relation to the direction of rolling (see Table), this suggests that the material from example "c" has moderate plasticity. As regards length growth and isotropy in the change of length longitudinally and transversely in relation to the direction of rolling (see FIGS. 3a and 3b). The material produced in this manner is interesting for sample production in which laser-cutting and electrical discharge machining techniques, etc. are used to produce parts. In addition, the cutting test using metal shears shows that the corresponding material is of sufficient quality for cutting and cutting to length and that it can be used to manufacture sheet for input stock for sample production. With a properly designed stamping tool, punching of parts is possible as well.

However, the material of example "d", and to a limited extent of example "e", according to the invention shows even better plasticity and very low and almost isotropic length growth longitudinally and transversely in relation to the direction of rolling. The use of such material states would therefore make the design of punching tools for the production of dimensionally stable finally annealed punched parts, punched and bent parts and punch-laminated parts from a Fe—Co-2V type alloy such as VACODUR 49 possible.

In summary:

It is possible using continuous annealing below the order-disorder transition temperature To/d or below 700° C. to establish a material state that exhibits low isotropic residual or permanent growth due to partial ordering produced by this continuous annealing process.

It is possible using continuous annealing below 700° C. in conjunction with preliminary stationary annealing to reduce dislocations and recrystallization to achieve growth in the region of 0.02% that, with a difference of 0.0019% between longitudinal and transverse linear expansion, that is almost isotropic.

It is possible to achieve better isotropy between longitudinal and transverse growth than with continuous annealing processes carried out at a peak temperature above the order transition temperature To/d of the Fe—Co-2V type alloy.

In addition to very low isotropic growth, the examples according to the invention show a ductile behaviour that is expressed in the form of increased elongation at fracture and better bending properties.

What is claimed is:

1. A method of producing a CoFe alloy strip, comprising:
hot rolling a CoFe alloy to form a hot rolled strip, followed by quenching the strip from a temperature above 700° C. to a temperature of 200° C., wherein the CoFe alloy consists essentially of 35 wt %≤Co≤55 wt %, 0 wt %≤V≤3 wt %, 0 wt %≤Ni≤2 wt %, 0 wt %≤Nb≤0.50 wt %, 0 wt %≤Zr+Ta≤1.5 wt %, 0 wt %≤Cr≤3 wt %, 0 wt %≤Si≤3 wt %, 0 wt %≤Al≤1 wt %, 0 wt %≤Mn≤1 wt %, 0 wt %≤B≤0.25 wt %, 0 wt %≤C≤0.1 wt %, with the remainder being Fe as well as up to 1 wt % of impurities, wherein the impurities may comprise one or more elements from the group consisting of O, N, S, P, Ce, Ti, Mg, Be, Cu, Mo, W and up to 0.2 wt % of other impurities, and the CoFe alloy comprises an order/disorder temperature $T_{o/d}$ and a ferritic/austenitic transformation temperature $T_{\alpha/\gamma}$, wherein $T_{\alpha/\gamma} > T_{o/d}$, cold rolling the quenched hot rolled strip, and the cold rolled strip has a thickness which is less than 0.50 mm after the cold rolling step,
after cold rolling, continuous annealing the strip at a maximum temperature $T_1$, wherein $T_1$ is less than the order/disorder temperature $T_{o/d}$ and 660° C.<$T_1$<700° C., followed by cooling at a cooling rate $R_1$ of at least 1 K/s in the temperature range of $T_1$ to 500° C.,
forming a plurality of laminations from the strip, and
annealing the laminations at a temperature between 730° C. and $T_{\alpha/\gamma}$ and stacking the annealed laminations to form a laminated core.

2. The method according to claim 1, wherein
after cold rolling, the strip comprises a disordered CoFe alloy phase with a bcc crystal structure and a Vickers Hardness HV of at least 320,
after continuous annealing, the strip comprises a partially ordered CoFe alloy phase with a B2 superstructure and a Vickers Hardness HV of at least 300,
after annealing, the strip or a part manufactured from the strip, comprises an ordered CoFe alloy phase with a B2 superstructure and a Vickers Hardness HV of at most 300, and where the dimensional change in any lateral direction upon this annealing is less than 0.08%, if compared to the strip having the partially ordered CoFe alloy phase before the annealing.

3. The method according to claim 1, wherein the cooling rate $R_1$ lies in the range of 10 K/s to 100 K/s.

4. The method according to claim 1, wherein the strip passes through a continuous furnace at a speed between 2 m/min to 4 m/min in order to continuously anneal the strip.

5. The method according to claim 4, wherein the dwell time of the strip in the heating zone of the continuous furnace with the temperature $T_1$ is between 30 seconds and 5 minutes.

6. The method according to claim 1, further comprising:
stationary annealing the cold rolled strip and after stationary annealing, performing the continuous annealing the strip at the maximum temperature Ti.

7. The method according to claim 6, wherein the stationary annealing is performed at a maximum temperature $T_2$, wherein $T_{o/d} \leq T_2 < T_{\alpha/\gamma}$ or $(T_{o/d}-50K) \leq T_2 < T_{o/d}$.

8. The method according to claim 7, wherein the temperature $T_2$ is between 650° C. and 900° C.

9. The method according to claim 6, wherein after stationary annealing the strip is cooled to less than 500° C. at a cooling rate $R_2$ of 50 K/h to 300 K/h.

10. The method according to claim 1, wherein the hot rolled strip has a thickness of $D_1$ which is between 2.0 mm and 7.0 mm.

11. The method according to claim 1, further comprising applying an electrically insulating layer to at least one surface of the cold rolled strip.

12. The method according to claim 11, wherein after annealing the difference between a permanent growth in a longitudinal direction and the permanent growth in a transverse direction of the strip is less than 0.03%.

13. The method according to claim 2, wherein after annealing, the dimensional change in any lateral direction is less than 0.05%, if compared to the strip having the partially ordered CoFe alloy phase before the annealing.

14. The method according to claim 1, wherein 660° C.$\leq T_1 \leq$690° C.

15. The method according to claim 8, wherein the temperature $T_2$ is between 680° C. and 760° C.

16. The method according to claim 10, wherein the hot rolled strip has a thickness of $D_1$ which is between 2.0 mm and 4.0 mm, and/or the cold rolled strip has a thickness $D_2$ which is between 0.005 mm and 0.35 mm.

17. The method according to claim 12, wherein after annealing the difference between the permanent growth in a longitudinal direction and the permanent growth in a transverse direction of the strip is less than 0.015%.

18. A method of producing a CoFe alloy strip, comprising:
hot rolling a CoFe alloy to form a hot rolled strip, followed by quenching the strip from a temperature above 700° C. to a temperature of 200° C., wherein the CoFe alloy consists essentially of 35 wt %$\leq$Co$\leq$55 wt %, 0 wt %$\leq$V$\leq$3 wt %, 0 wt %$\leq$Ni$\leq$2 wt %, 0 wt %Nb$\leq$0.50 wt %, 0 wt %$\leq$Zr+Ta$\leq$1.5 wt %, 0 wt %$\leq$Cr$\leq$3 wt %, 0 wt %$\leq$Si$\leq$3 wt %, 0 wt %$\leq$Al$\leq$1 wt %, 0 wt %$\leq$Mn$\leq$1 wt %, 0 wt %$\leq$B$\leq$0.25 wt %, 0 wt %$\leq$C$\leq$0.1 wt %, with the remainder being Fe as well as up to 1 wt % of impurities, wherein the impurities may comprises one or more elements from the group consisting of O, N, S, P, Ce, Ti, Mg, Be, Cu, Mo, W and up to 0.2 wt % of other impurities, and the CoFe alloy comprises an order/disorder temperature $T_{o/d}$ and a ferritic/austenitic transformation temperature $T_{\alpha/\gamma}$, wherein $T_{\alpha/\gamma} > T_{o/d}$,
cold rolling the quenched hot rolled strip,
wherein after cold rolling, the strip comprises a disordered CoFe alloy phase with a bcc crystal structure and a Vickers Hardness HV of at least 320, and wherein the cold rolled strip has a thickness which is less than 0.50 mm after the cold rolling step,
after cold rolling, continuous annealing the strip at a maximum temperature $T_1$, wherein $T_1$ is less than the order/disorder temperature $T_{o/d}$ and 660° C.<$T_1$<700° C., followed by cooling at a cooling rate $R_1$ of at least 1 K/s in the temperature range of $T_1$ to 500° C., wherein after continuous annealing, the strip comprises a partially ordered CoFe alloy phase with a B2 superstructure and a Vickers Hardness HV of at least 300, and
after continuous annealing, annealing the strip at a temperature between 730° C. and $T_{\alpha/\gamma}$, wherein after annealing, the strip or a part manufactured from the strip comprises an ordered CoFe alloy phase with a B2 superstructure and a Vickers Hardness HV of at most 300, and where the dimensional change in any lateral direction upon this annealing is less than 0.08%, if compared to the strip having the partially ordered CoFe alloy phase before the annealing.

19. The method according to claim 1, wherein the laminations are formed by punching or eroding or the laminations are cut by a water jet or by a laser.

20. The method according to claim 1 further comprising applying an electrically insulating layer to at least one surface of the cold rolled strip.

21. The method according to claim 20, wherein the electrically insulating layer is applied to the cold-rolled strip by dip-coating or spraying a solution.

22. The method according to claim 21, wherein the solution is based on Mg-methylate, and after continuous annealing, a layer of MgO is formed from the solution.

23. The method according to claim 20, wherein the electrically insulating layer is an inorganic layer comprising MgO, zirconium oxide or aluminium oxide.

24. A method of producing a CoFe alloy strip, comprising:
hot rolling a CoFe alloy to form a hot rolled strip, followed by quenching the strip from a temperature above 700° C. to a temperature of 200° C., wherein the CoFe alloy consists essentially of 35 wt %$\leq$Co$\leq$55 wt %, 0 wt %$\leq$V$\leq$3 wt %, 0 wt %$\leq$Ni$\leq$2 wt %, 0 wt %$\leq$Nb$\leq$0.50 wt %, 0 wt %$\leq$Zr+Ta$\leq$1.5 wt %, 0 wt %$\leq$Cr$\leq$3 wt %, 0 wt %$\leq$Si$\leq$3 wt %, 0 wt %$\leq$Al$\leq$1 wt %, 0 wt %$\leq$Mn$\leq$1 wt %, 0 wt %$\leq$B$\leq$0.25 wt %, 0 wt %$\leq$C$\leq$0.1 wt %, with the remainder being Fe as well as up to 1 wt % of impurities, wherein the impurities may comprise one or more elements from the group consisting of O, N, S, P, Ce, Ti, Mg, Be, Cu, Mo, W and up to 0.2 wt % of other impurities, and the CoFe alloy comprises an order/disorder temperature $T_{o/d}$ and a ferritic/austenitic transformation temperature $T_{\alpha/\gamma}$, wherein $T_{\alpha/\gamma} > T_{o/d}$,
cold rolling the quenched hot rolled strip, the strip having a thickness of less than 0.50 mm after the cold rolling step,
after cold rolling, continuous annealing the strip at a maximum temperature Ti, wherein $T_1$ is less than the order/disorder temperature $T_{o/d}$ and 660° C.<$T_1$<700° C., followed by cooling at a cooling rate $R_1$ of at least 1 K/s in the temperature range of $T_1$ to 500° C.,
forming a plurality of laminations from the strip, and
stacking the laminations to form a laminated core and annealing the laminated core at a temperature between 730° C. and $T_{\alpha/\gamma}$.

25. The method according to claim 2, wherein after continuous annealing, the strip comprises a Vickers Hardness HV of at least 310.

26. The method according to claim 1, wherein the Vickers Hardness of the strip is increased after continuous annealing compared to the hardness of the strip after cold rolling based.

* * * * *